United States Patent
Van Den Berg et al.

(10) Patent No.: US 9,622,452 B2
(45) Date of Patent: Apr. 18, 2017

(54) UNMANNED VEHICLE COMPRISING A PROTECTION DEVICE

(75) Inventors: Karel Van Den Berg, Bleskensgraaf (NL); Matthew Van Meurs, Rotterdam (NL); Jan Martinus Van Kuilenburg, Wadenoyen (NL)

(73) Assignee: LELY PATENT N.V., Maassluis (NL)

( * ) Notice: Subject to any disclaimer, the term of this patent is extended or adjusted under 35 U.S.C. 154(b) by 1104 days.

(21) Appl. No.: 13/087,406

(22) Filed: Apr. 15, 2011

(65) Prior Publication Data
US 2011/0185975 A1    Aug. 4, 2011

Related U.S. Application Data

(63) Continuation of application No. PCT/NL2009/000193, filed on Oct. 6, 2009.

(30) Foreign Application Priority Data

Oct. 16, 2008 (NL) ..................................... 1036081

(51) Int. Cl.
| | | |
|---|---|---|
| *A01K 1/01* | (2006.01) | |
| *A01K 5/02* | (2006.01) | |
| *A01K 15/04* | (2006.01) | |
| *A01K 1/10* | (2006.01) | |
| *A01K 15/02* | (2006.01) | |

(52) U.S. Cl.
CPC ................ *A01K 1/01* (2013.01); *A01K 1/105* (2013.01); *A01K 5/0266* (2013.01); *A01K 15/029* (2013.01)

(58) Field of Classification Search
CPC ........ A01K 1/01; A01K 1/105; A01K 5/0266; A01K 15/029
USPC ....... 180/169, 271, 274; 701/23–28; 15/319, 15/340.1
See application file for complete search history.

(56) References Cited

U.S. PATENT DOCUMENTS

| | | | | |
|---|---|---|---|---|
| 2,208,697 | A | * | 7/1940 | Grisham ................ B60Q 9/003 180/274 |
| 2,966,256 | A | | 12/1960 | McLeland |
| 3,273,038 | A | | 9/1966 | Miller |
| 3,362,711 | A | * | 1/1968 | Larsen .................... F41B 15/04 231/7 |

(Continued)

FOREIGN PATENT DOCUMENTS

| | | |
|---|---|---|
| DE | 1109441 B | 6/1961 |
| DE | 1183301 B | 12/1964 |

(Continued)

OTHER PUBLICATIONS

International Search Report and Written Opinion for PCT/NL2009/000193 (issued Jan. 14, 2010).
NL Search Report for NL 1036081 (issued Apr. 15, 2009).

*Primary Examiner* — John Walters
(74) *Attorney, Agent, or Firm* — Hoyng Rokh Monegier LLP; Ramin Amirsehhi; David P. Owen

(57) ABSTRACT

Unmanned vehicle to carry out an animal-related action, provided with a frame and a control device to control the vehicle and a locomotion device to move the unmanned vehicle, and with a protective device to protect the vehicle against obstacles, wherein the protective device includes a touchable electrical conductor which extends on the outside of, advantageously around, the vehicle, and a voltage source to supply voltage to the conductor under the control of the control device.

20 Claims, 3 Drawing Sheets

(56) References Cited

U.S. PATENT DOCUMENTS

| | | | |
|---|---|---|---|
| 3,560,922 A * | 2/1971 | Wilson | H03K 5/13 |
| | | | 180/116 |
| 5,109,566 A | 5/1992 | Kobayashi et al. | |
| 5,281,949 A * | 1/1994 | Durley | B60Q 1/50 |
| | | | 180/167 |
| 5,309,592 A | 5/1994 | Hiratsuka | |
| 5,341,540 A | 8/1994 | Soupert et al. | |
| 5,646,494 A | 7/1997 | Han | |
| 7,804,274 B2 * | 9/2010 | Baxter | B60L 11/1816 |
| | | | 180/65.1 |
| 2007/0158120 A1 * | 7/2007 | Lee | B60K 6/26 |
| | | | 180/65.28 |
| 2009/0030712 A1 * | 1/2009 | Bogolea | B60L 11/1816 |
| | | | 705/1.1 |

FOREIGN PATENT DOCUMENTS

| | | |
|---|---|---|
| DE | 4425924 A1 | 1/1996 |
| DE | 4444508 C1 | 2/1996 |
| EP | 142594 | 5/1985 |
| EP | 382693 A1 | 8/1990 |
| EP | 943235 A2 | 9/1999 |
| EP | 1369010 A1 | 12/2003 |
| EP | 1369012 A1 | 12/2003 |
| FR | 2463566 A1 | 2/1981 |
| GB | 1487360 A | 9/1977 |
| GB | 2313190 A | 11/1997 |
| GB | 2313191 A | 11/1997 |
| WO | 0070937 A1 | 11/2000 |
| WO | 0070941 A1 | 11/2000 |
| WO | 02064129 A2 | 8/2002 |
| WO | 2007120036 A1 | 10/2007 |

* cited by examiner

UNMANNED VEHICLE COMPRISING A PROTECTION DEVICE

CROSS REFERENCE TO RELATED APPLICATIONS

This application is a continuation application of PCT/NL2009/000193, filed Oct. 6, 2009, which claims priority from Netherlands application number NL1036081 filed 16 Oct. 2008. The contents of both applications are hereby incorporated by reference in their entirety.

BACKGROUND OF THE INVENTION

1. Field of the Invention

The invention relates generally to unmanned vehicles to carry out animal-related action, and more particularly to a protective device that comprises a touchable electrical conductor which extends on the outside of, and advantageously around, the vehicle, and a voltage source to supply voltage to the conductor under the control of the control device.

2. Description of the Related Art

An unmanned vehicle is known from EP 1 100 317 with a bumper to protect the vehicle against obstacles such as cows' legs.

It is a disadvantage that a bumper of this type often provides insufficient protection, because cows are large and strong animals which do not often move aside for an unmanned vehicle. The vehicle may be damaged as a result, or, for example, may not perform its function correctly.

BRIEF SUMMARY OF THE INVENTION

The object of the invention is to overcome the aforementioned disadvantages. The invention achieves this object with an unmanned vehicle having a frame, a control device to control the vehicle, a locomotion device to move the unmanned vehicle, and with a protective device, wherein, in particular, the protective device comprises a touchable electrical conductor which extends on the outside of, advantageously around, the vehicle, and a voltage source to supply voltage to the conductor under the control of the control device.

Electrical conductors with a voltage source to provide protection are known from for example electric fences and the like. However, the present invention goes one step further here by making the voltage source controllable by a control device. As a result, a certain degree of flexibility, and therefore the additional (current) protection, can be incorporated when the voltage source is activated or de-activated. This is based on the insight that the protection does not need to be activated in all cases, not even during the performance of the animal-related action. An example occurs when an animal is located in a corner of a space, and the exit is blocked by the vehicle. If the vehicle gives the animal electric shocks in such a situation, this will be highly disadvantageous. The insight wherein the protection is controllable is set out in further detail below.

The voltage source supplies, in particular, a high voltage, either a constant voltage, or, advantageously, a regular or irregular, pulsed voltage. Here, activation of the voltage source means the emission of a constant voltage or the start of emission with voltage pulses.

In particular, the vehicle comprises a bumper in which the conductor is disposed. Although the conductor may be a separate component, it is advantageous for it to be disposed in a bumper due to the structural rigidity.

The vehicle advantageously comprises a plurality of conductors, each one extending over a part of the circumference of the vehicle. In particular, these are configured to be supplied with voltage by the voltage source, independently from one another and under the control of the control device, more particularly depending on the animal-related action or a driving manoeuvre. As a result, the electrically supported protection can be adjusted to the segment where the conductor extends, such as on specific corners, or to the front or rear. For example, it may be decided to supply voltage to the front only, in relation to a driving direction, to ensure a drive which is as unobstructed as possible. Some applications of the invention take place in an area where animals may be located on an animal side, whereas only people can move freely on the other side. In this case, only the conductor on the animal side is supplied with voltage. An application of this type takes place, for example, when the unmanned vehicle pushes feed into a feed trough. The animal side is then the side of the vehicle facing towards the feed trough.

In particular, the control device is configured to activate the voltage source during the performance of a predetermined action. One example, which is explained in detail below, is the pushing or driving around of feed, in which case it is undesirable if animals come towards the vehicle and consume the feed or otherwise interfere with operations'. If, for example, the vehicle drives back following the action, or, for example, proceeds to a recharging station, the protection is less relevant, and the mechanical protection of a bumper or the like may suffice. An important consideration in the invention is also that animals must not be excessively frightened and that energy should not be wasted unnecessarily by supplying voltage to the conductor(s). Furthermore, it can increase the safety for others, such as children or unsuspecting bystanders if the vehicle applies electrical safety only when performing the directly intended task.

In embodiments, the unmanned vehicle comprises orientation means to follow a route in a space and/or to determine the position of the vehicle in a space, such as a stable or a pasture. With the orientation provided, the control device can, for example, determine whether the voltage source needs to be de-activated, for example because the vehicle is located in a corner, and an animal which may be present cannot move away, so that it cannot or may not be driven away, even with the electrical protection.

Many orientation means are possible per se, but the orientation mechanism advantageously comprises floor-detection means to detect openings in the floor and/or to detect a guide in the floor (floor-detection mechanism), such as the core rod in the concrete or an electrically conducting wire, or an ultrasound detector, an optical detector or a GPS detector. These are reliable means, which have also proven to be robust in the often dirty environment of stables and other livestock houses. The openings in the floor are usually present to remove the manure as described above. If the stable floor is made of concrete, a metal grid is usually fitted into the floor to provide additional strength. This grid can be detected by the floor-detection means with the aid of, for example, an induction coil. Additional orientation means may comprise a compass and/or a gyroscope and/or a spirit level and/or a clinometer and/or an accelerometer.

In particular, the orientation means comprise wall-following means to detect and follow a wall, such as a fixed stable wall or the edge of a lying box. Such a wall-following mechanisms, which may incidentally partially overlap the aforementioned orientation means, are also simple and useful, as the animal-related action often takes place along a route along a wall.

In another embodiment, the unmanned vehicle comprises detection mechanism to detect an object within a predetermined distance from the vehicle, in particular comprising a contact detector which, more particularly, is disposed in the bumper, wherein, in particular, the control device is configured to activate the voltage source if an object is detected within the predetermined distance, in particular if the contact detector detects a contact. Thus, for example, the voltage source can be activated if an obstacle, in particular an animal, is detected nearby. In any event, it is unnecessary to activate the voltage source if no animal is in the vicinity. This not only saves energy, but is furthermore safer. The predetermined distance may be the distance which, averaged within a specific time, is traveled by the animal and/or the vehicle, such as 1 or 2 meters. In particular, this distance is zero, so that the protection responds to contact.

In one embodiment, the control device is configured to de-activate the voltage source depending on the detected position. Thus, it is specifically possible to de-activate the electrical protection in the event that an animal is detected in a position from which it cannot escape and an electric shock is therefore very undesirable.

The control device is advantageously configured to activate the voltage source on only a predetermined part of the route, in particular if the orientation means determine that the unmanned vehicle is located on the predetermined part of the route. As a result, the activation can remain limited to the parts of the route where this is most appropriate, for example, not after unloading or on the way to a charging station.

The control device is advantageously remotely controllable. This makes it easy to use, but also affords additional safety if, for example, the protection needs to be de-activated because a child or domestic animal is located in the vicinity of the vehicle. The remote control may be performed, for example, using a known infrared or ultrasound remote operation or a telephone, radio or Internet connection.

The animal-related action is not particularly limited. However, the unmanned vehicle according to the invention preferably comprises a manure-removal means. The manure-removal mechanism preferably comprise at least one brush and/or at least one manure scraper and/or at least one spraying device. Further details can be found, for example, in the aforementioned document EP1100317, which is hereby incorporated by reference in its entirety. A so-called "manure robot" very often works in spaces with animals, and must follow specific routes in order to correctly carry out its work. The invention is very appropriate in this respect.

Alternatively or additionally, the unmanned vehicle comprises a feed-pushing mechanism or a feed trough. In this case, the animal-related action relates to the pushing of feed. A feed-pushing means is described, for example, in NL1031605, which is explicitly referred to for further details. A feed-pushing means is often used with feeding animals, and again the work can only be done correctly if the animals remain at a distance from the feed pushing device. The example with the feed trough has already been mentioned above, and it will be clear that a filled feed trough needs to reach its destination intact.

The unmanned vehicle furthermore comprises locomotion means and can turn by varying the circumferential speed of the locomotion elements. The locomotion elements may comprise a wheel and/or caterpillar track. Caterpillar tracks have the advantage that they are less susceptible to skidding than wheels.

It will be clear that the unmanned vehicle can be used not only to move manure or feed, but also to perform other tasks, such as the spreading of material, for example sawdust and straw, to determine and control the climatic conditions in the stable and to determine the behaviour and health of the animals. The vehicle can also be used in a pasture, for example as a carrier for fencing. A vehicle of this type, possibly working together with similar vehicles, moves a movable fence for a herd, and has an animal side on the inside of the fencing and a free side on the outside thereof.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

Figure 1:
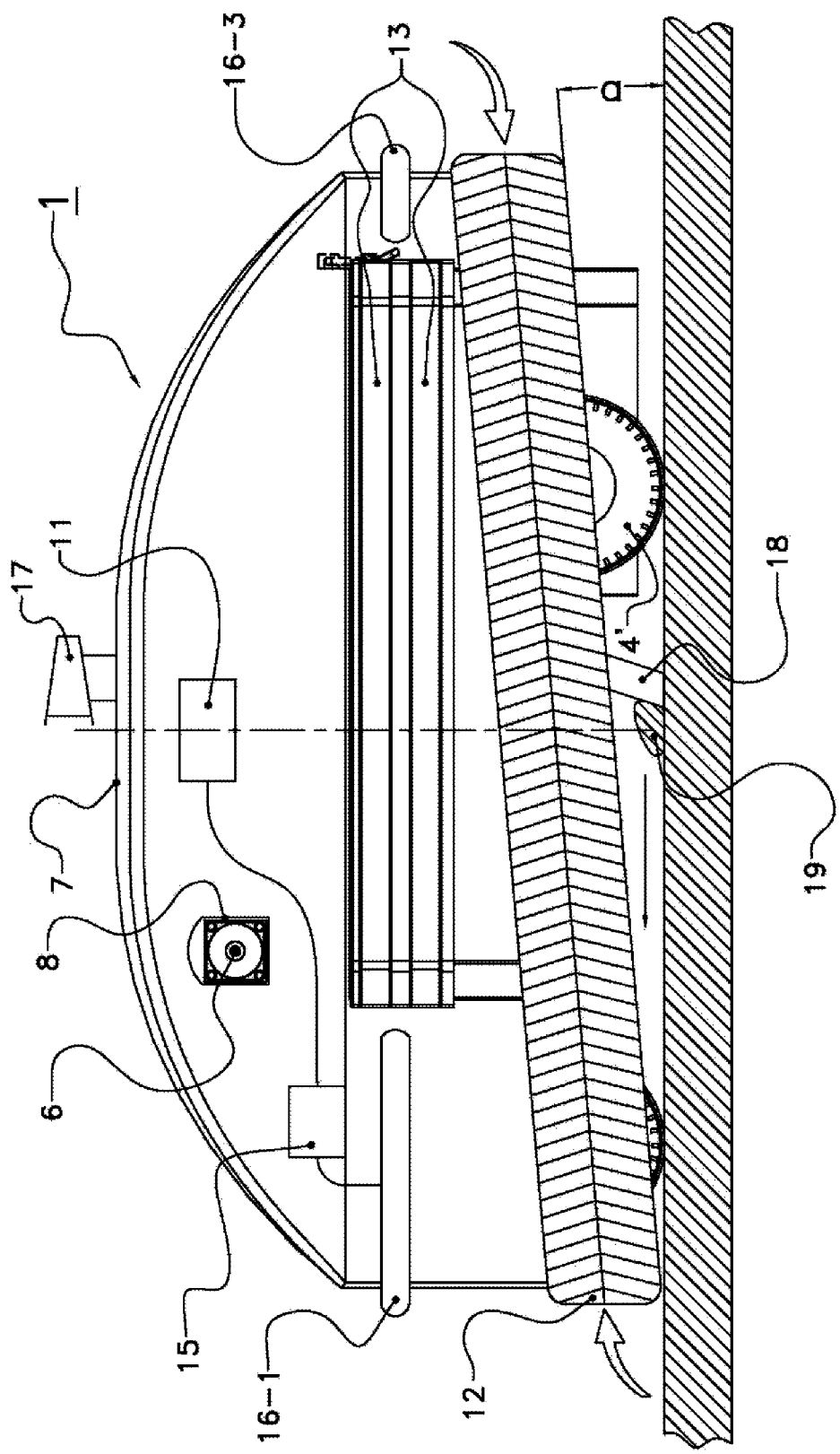
FIG. 1 shows a schematic side view of the unmanned vehicle according to the invention.
Figure 2:
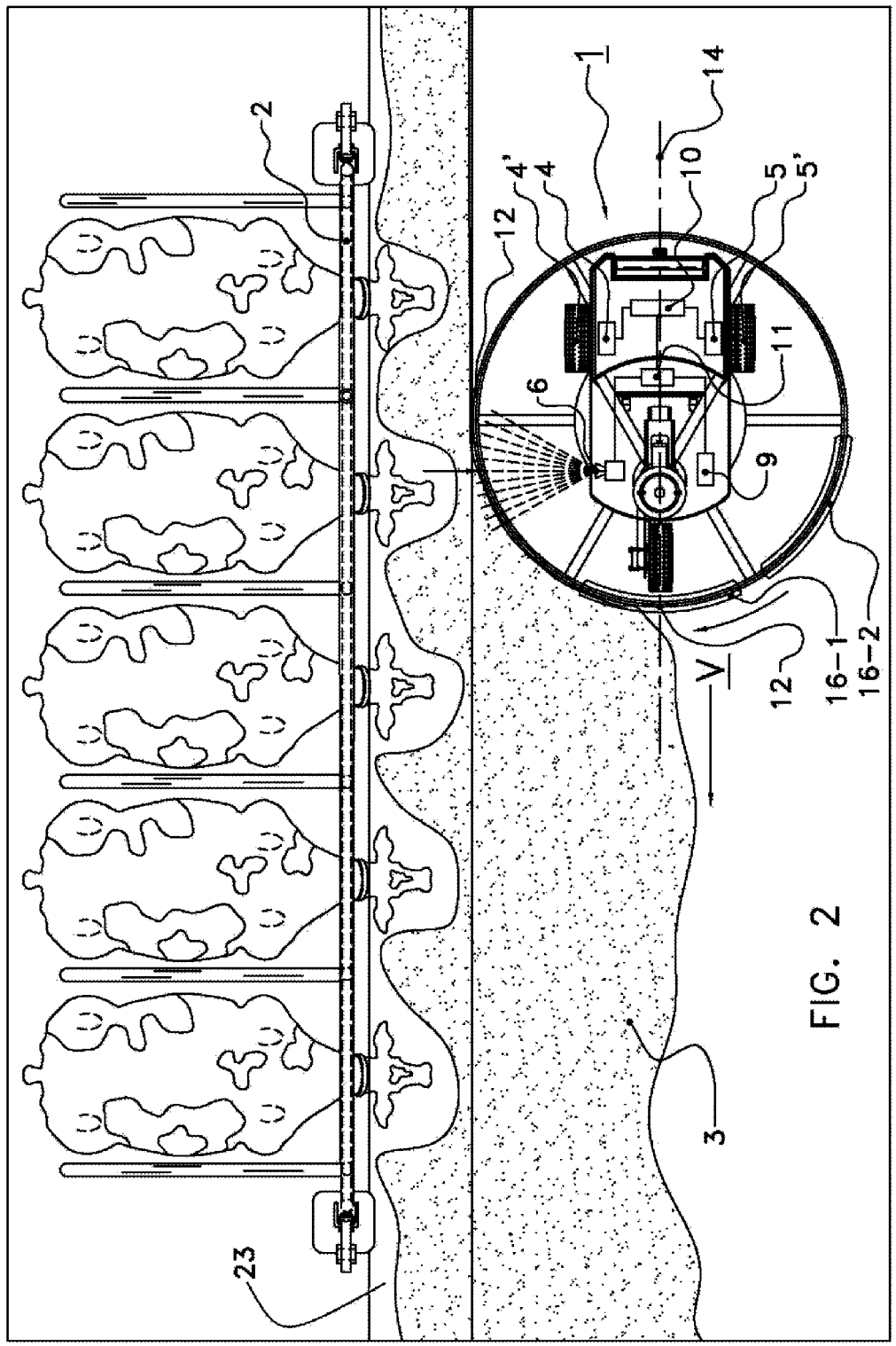
FIG. 2 shows a schematic top view of the unmanned vehicle according to the invention for use in moving feed to a feeding rack.
Figure 3:
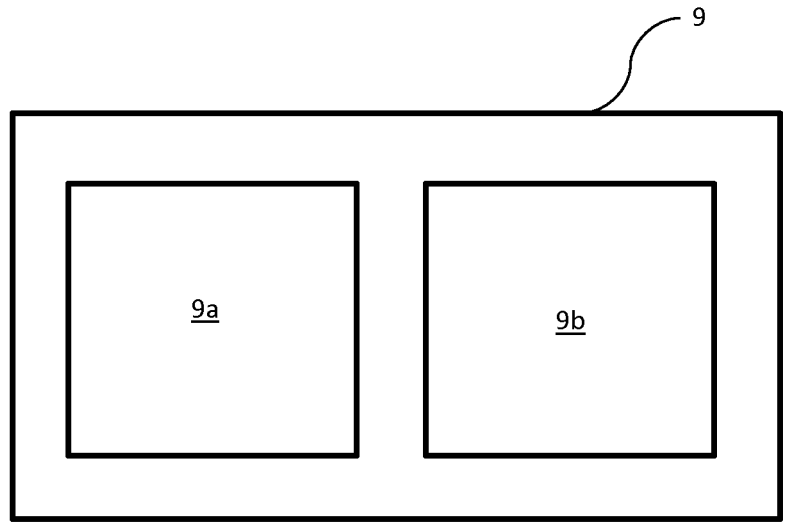
FIG. 3 shows an orientation means 9 having a floor detection mechanism 9a and wall following means 9b.
Figure 4:
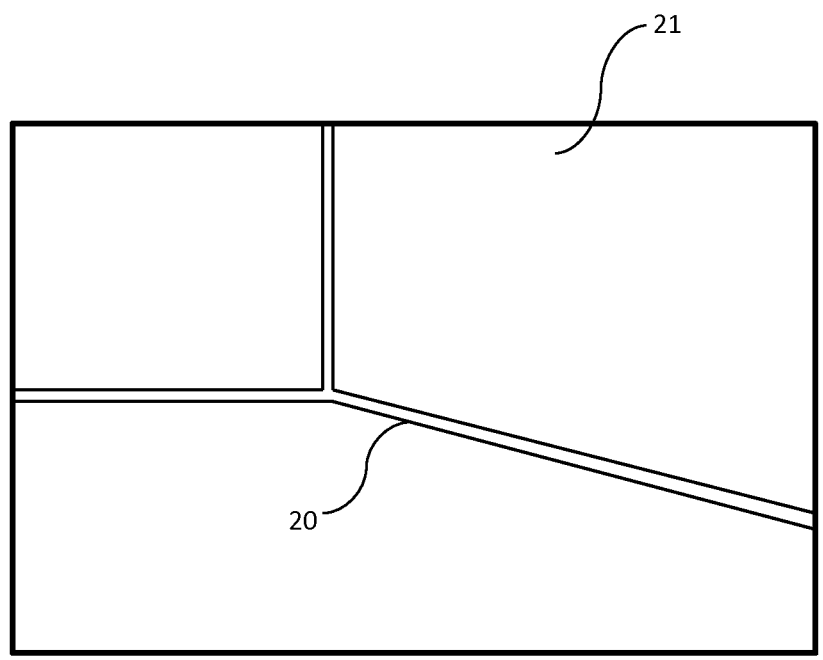
FIG. 4 shows a floor guide 20 on a floor 21.

FIGS. 1 and 2 show an unmanned autonomous vehicle 1 for the substantially lateral movement to a feeding rack 2 of feed 3 lying on a base. The feed 3, which may be solid, liquid or a mixture thereof, is deposited in a manner known per se near the feeding rack 2, for example with the aid of a tractor. FIG. 2 further shows a feed through 23.

Autonomous movable vehicles for the performance of numerous different functions, and also the control of such vehicles are known, and these will consequently not be described here in detail. The automatic recharging of the power supply of the vehicle and the automatic loading and unloading of other materials into or out of containers present on the vehicle are also known. It will suffice to refer to the following patent documents: U.S. Pat. No. 2,966,256, DE-1109441, DE-1183301, EP-0382693, DE-4425924, U.S. Pat. No. 5,309,592, EP-0142594, DE-4444508, GB-2313190, U.S. Pat. No. 5,109,566, GB-2313191, U.S. Pat. No. 3,273,038, NL-7416427, U.S. Pat. No. 5,341,540, U.S. Pat. No. 5,646,494, EP-0943235, EP-1369010, EP-1369012 and EP-1368017, which are hereby incorporated by reference in their entirety.

The unmanned vehicle 1 comprises two wheels 4', 5' which are separately driveable by separate drive means 4, 5. Furthermore, the unmanned vehicle 1 is provided with a distance-determination means 6, in the example shown an ultrasound sensor, to determine the distance from the vehicle 1 to the feeding rack 2. It will be clear that all sensors known in the prior art, such as, for example the sensors mentioned in the patent documents listed above, can be used for the distance determination. The unmanned vehicle 1 may be provided with an external protective casing 7, which is provided with openings 8, so that the ultrasound sensor 6 is able to detect the feeding rack 2. To prevent material, such as feed and the like, from accumulating via the openings 8 on the inside of the unmanned vehicle 1, the base of the unmanned vehicle 1 is at least partially open.

The unmanned vehicle 1 furthermore comprises an orientation-determination means 9, in the example shown a gyroscope, to determine the orientation of the centre line 14 of the vehicle 1 in relation to the feeding rack 2. A camera 17 is also provided, which, for example, can support the orientation, or can be provided with image recognition to recognize animals and the like. It will be clear that all sensors known in the prior art, such as, for example, the sensors mentioned in the patent documents listed above, such as an electronic compass, can be used for the orientation determination.

The unmanned vehicle 1 is also provided with a torque-difference-determination means 10 to determine the difference in torque between the wheels 4', 5'. A torque-difference-determination means of this type, which uses data from the drive means 4, 5, is known per se. A torque-difference-determination means of this type can also be used to detect skidding of one of the wheels, following which detection a corrective action (speed reduction, alerting of an operator) can be carried out.

The unmanned vehicle 1 is furthermore provided with a control unit 11 for the control and movement in a direction of travel of the unmanned vehicle 1, said control unit 11 being connected via electrical lines, or possibly wirelessly, to the distance-determination means 6, the orientation-determination means 9, the torque-difference-determination means 10, the camera 17, and the drives 4, 5 of the wheels 4', 5' for the exchange of data.

Furthermore, a voltage source is denoted by 15, while 16-1, 16-2 and 16-3 denote three bumper segments with electrical conductors. More segments can of course be fitted all around the vehicle 1, but this is not shown here for the sake of clarity. Only one segment 16, for example, can also be provided, all around the vehicle or otherwise. The voltage source is under the control of the control unit or control device 11, which is configured to activate the voltage source 15 depending on a part of a route, an animal-related action, etc., or to activate or de-activate the connection thereof to one or more bumper segments 16-1, 16-2, 16-3. Here, the control device 11 can use the orientation means 9, the distance-determination means 6, the camera 17 etc. If, for example, feed 3 is pushed, and cows come to less than a defined distance, for example, less than 0.20 m, from the vehicle 1, as determined with the distance-determination means 6, the control unit 11 can activate the voltage source 15.

It is also possible for the control unit 11 to be configured to activate only the front bumper segment 16-1 if the vehicle 1 moves forward in the direction of the arrow. The vehicle 1 has in any case already completed its task at the rear, at bumper segment 16-3.

Finally, 18 denotes a manure scraper, which removes a quantity of manure 19. The manure scraper 18 is known per se, so that no further details need to be provided here.

For the movement of feed 3 substantially across the locomotion direction V of the unmanned vehicle 1, the unmanned vehicle 1 is provided with feed-moving means 12. Feed-moving means 12 of this type may be formed by a diagonally positioned scoop or a conveyor belt. However, these feed-moving means 12 according to one embodiment of the invention are preferably formed by a freely rotatable, circular element 12, the outer circumference of which forms the outer circumference of the unmanned vehicle 1. If, during the operation of the unmanned vehicle 1, the circular element 12, which may, for example, be a ring or a disc, comes into contact with the feed, this element 12 is automatically rotated, in other words the circular element 12 is feed-driven. A highly reproducible movement of the feed is obtained if the circular element 12 is tilted at an angle α in such a manner that it is located closest to the ground, at least substantially in the locomotion direction V of the vehicle 1. The angle α defined by the circular element 12 and the ground can be adjustable depending on the feed to be moved. The angle α can possibly be adjusted during the operation of the vehicle 1 with tilting means known per se (not shown), such as a cylinder, controlled by the control unit 11.

When the feed 3 is deposited on the ground, and while the feed 3 is being consumed by animals present at the feeding rack 2, the feed 3 is accumulated to different heights over different distances to the feeding rack 2. In order that the animals can always easily get to a required quantity of feed 3, it is ensured, by allowing the unmanned vehicle 1 to regularly travel along the feeding rack 2, that feed 3 is moved to the feeding rack 2, as shown schematically in FIG. 2. For the unmanned vehicle 1 to be correctly controlled, the control unit 11 is programmed in such a way that, during operation, the vehicle 1 remains at a distance from the feeding rack 2 determined by the distance-determination means 6, said distance being equal to or greater than a preset minimum distance to the feeding rack 2, and that, during operation, the centre line 14 of the vehicle remains in an orientation determined by the orientation-determination means 9 in relation to the feeding rack 2, said orientation being at least virtually identical to a predefined orientation, and that, during operation, the drivable wheels 4, 5 of the unmanned vehicle 1 reveal a torque difference determined by the torque-difference-determination means 10 which is equal to or less than a preset maximum torque. As a result, the unmanned vehicle 1 always remains in a correct orientation in relation to the feeding rack 2, the unmanned vehicle 1 does not come within the minimum distance from the feeding rack 2, and it is ensured that the feed 3 is not excessively accumulated, since, in the event of an excessive quantity of feed 3 through which the unmanned vehicle 1 travels, the torque difference would be too great.

The control unit 11 is programmed in such a way that priority is given, for the control of the unmanned vehicle 1, to the distance determined by the distance-determination means 6 in combination with the preset minimum distance.

In a preferred embodiment of an unmanned vehicle 1, the presettable distance is settable during operation. The setting may be dependent, for example, on the time of day, the period which has elapsed since the unmanned vehicle 1 was present at the same position, the type of animals or the individual animals which are present at the feeding rack 2. Similarly, in a preferred embodiment of an unmanned vehicle 1, the preset maximum torque difference and/or the preset orientation is settable during operation.

The unmanned autonomous vehicle 1 is provided with a rechargeable voltage source 15 in the form of a battery which can be brought into contact with a charger via laterally disposed recharging strips 13. Other ways to recharge the voltage source 15, such as inductive means, are specified, inter alia, in the aforementioned patent documents.

Although this is not shown in the Figures, the unmanned vehicle 1 can additionally be configured to dispense feed 3. To do this, the unmanned vehicle 1 can be provided with a supply trough to contain feed and a discharge device to discharge feed onto the ground. The supply trough is preferably provided with a mixing means to mix feed. Here, it is advantageous if the control unit 11 controls the operation of the discharge device using data from the distance-determination means and/or the torque-difference-determination means and/or the speed of the vehicle 1 and/or the weight decrease of the supply trough. As a result, inter alia, the discharge of a uniform quantity of feed is possible. If, for example, in the case of a specific distance to the feeding rack 2, the torque difference falls below a defined value (for example, defined in a lookup table which is stored in a memory of the control unit), the quantity of feed 3 has decreased below a defined value. As a result of these data, the discharge device can deposit a specific quantity of feed 3 at that location on the ground. Alternatively or additionally, the unmanned vehicle 1 can be provided with a signalling means (for example a transmission antenna with a suitably controlling transmission circuit) to emit a signal (for example for the attendance of an owner and/or operator of the unmanned vehicle), wherein the control unit 11 controls the operation of the signalling means using data from the distance-determination means 6 and/or the torque-difference-determination means.

The invention is based on the insight that the amount of the torque difference is dependent on the quantity of feed 3 present on the ground through which the unmanned vehicle moves, and this torque difference can therefore be used in an advantageous manner together with the determined distance and orientation for a correct control of the unmanned vehicle 1.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An unmanned vehicle to carry out an animal-related action, comprising:
    a frame,
    a control device to control the vehicle,
    a locomotion device to move the unmanned vehicle, and
    a protective device to protect the vehicle against obstacles,
    wherein the protective device comprises a touchable electrical conductor which extends on the outside of the vehicle, and a voltage source to supply voltage to the conductor under the control of the control device, and
    wherein the control device is configured to activate the voltage source during performance of a predetermined action,
    wherein the electrical conductor extends around the vehicle.

2. The unmanned vehicle according to claim 1, comprising a bumper in which the conductor is disposed.

3. The unmanned vehicle according to claim 1, comprising a plurality of conductors which extend over a part of the circumference of the vehicle, and which are configured to be supplied with voltage by the voltage source, independently from one another and under the control of the control device.

4. The unmanned vehicle according to claim 3, configured to be supplied with voltage by the voltage source depending on the animal-related action or a driving manoeuvre.

5. The unmanned vehicle according to claim 1, wherein the vehicle comprises an orientation mechanism to at least one of: follow a route in space and determine the position of the vehicle in a space.

6. The unmanned vehicle according to claim 5, wherein the space is a stable or a pasture.

7. The unmanned vehicle according to claim 5, wherein the control device is configured to de-activate the voltage source depending on the determined position.

8. The unmanned vehicle according to claim 7, wherein the control device is configured to activate the voltage source on only a predetermined part of the route.

9. The unmanned vehicle according to claim 8, wherein the control device is configured to activate the voltage source if the orientation mechanism determines that the unmanned vehicle is located on the predetermined part of the route.

10. The unmanned vehicle according to claim 5, wherein the orientation mechanism comprises a floor-detection mechanism to at least one of detect openings in the floor and to detect a guide in the floor.

11. The unmanned vehicle according to claim 10, wherein the guide comprises at least one of: a core rod in the concrete, an electrically conducting wire, an ultrasound detector, an optical detector and a GPS detector.

12. The unmanned vehicle according to claim 5, wherein the orientation mechanism comprises a wall-following mechanism to detect and follow a wall.

13. The unmanned vehicle according to claim 12, wherein the wall comprises a fixed stable wall or the edge of a lying box.

14. The unmanned vehicle according to claim 1, comprising a detection mechanism to detect an object within a predetermined distance from the vehicle.

15. The unmanned vehicle according to claim 14, wherein the detection mechanism comprises a contact detector which is disposed in the bumper.

16. The unmanned vehicle according to claim 15, wherein the control device is configured to activate the voltage source if the contact detector detects a contact.

17. The unmanned vehicle according to claim 14, wherein the control device is configured to activate the voltage source if an object is detected within the predetermined distance.

18. The unmanned vehicle according to claim 1, wherein the control device is remotely controllable.

19. The unmanned vehicle according to claim 1, comprising a manure-removal mechanism.

20. The unmanned vehicle according to claim 1, comprising at least one of a feed-pushing mechanism and a feed trough.

* * * * *